United States Patent [19]

Wiacek et al.

[11] Patent Number: 5,080,985
[45] Date of Patent: Jan. 14, 1992

[54] HIGH PRESSURE SEAL FOR ALKALINE CELLS

[75] Inventors: Marian Wiacek, Holliston; Vance R. Shepard, Jr., Hubbardston, both of Mass.; Robert A. Yoppolo, Woonsocket, R.I.; Robert J. Payne, Wellesley, Mass.; Peter J. Pope, Balcombe, England; Boris Falczuk, Waterbury, Conn.

[73] Assignee: Duracell Inc., Bethel, Conn.

[21] Appl. No.: 447,309

[22] Filed: Dec. 7, 1989

[51] Int. Cl.⁵ .......................................... H01M 2/04
[52] U.S. Cl. .................................. 429/172; 429/174; 429/175
[58] Field of Search ............... 429/56, 172, 175, 177, 429/174

[56] References Cited

U.S. PATENT DOCUMENTS

| | | |
|---|---|---|
| 3,042,734 | 7/1962 | Carmichael et al. |
| 3,068,313 | 12/1962 | Daley |
| 3,069,489 | 12/1962 | Carmichael et al. |
| 3,218,197 | 11/1965 | Carmichael et al. |
| 3,219,488 | 11/1965 | Southworth |
| 3,314,824 | 4/1967 | Spanur |
| 3,617,386 | 11/1971 | Bosben ................... 429/56 |
| 3,895,959 | 7/1975 | Dehmelt .................. 429/172 X |
| 4,060,671 | 11/1977 | Vander Velden ........... 429/174 |
| 4,122,242 | 10/1978 | Feldhake ................. 429/174 |
| 4,227,701 | 10/1980 | Tsuchida et al. .......... 429/56 X |
| 4,237,203 | 12/1980 | Tsuchida et al. .......... 429/56 X |
| 4,251,602 | 2/1981 | Beatty .................... 429/54 |
| 4,309,493 | 1/1982 | Kuhl et al. ............... 429/172 |
| 4,537,841 | 8/1985 | Wiacek et al. ............ 429/56 |
| 4,632,887 | 12/1986 | Jung ..................... 429/172 X |
| 4,725,515 | 2/1988 | Jurca .................... 429/174 |

FOREIGN PATENT DOCUMENTS 974588  9/1975  Canada.

Primary Examiner—Stephen J. Kalafut
Attorney, Agent, or Firm—Ronald S. Cornell; James B. McVeigh, Jr.

[57] ABSTRACT

This invention relates to a seal for a cylindrical alkaline cell. The member includes a metal support having an annular spring disposed at the outer periphery. The spring is placed under compression by a radial crimp and the spring is adapted to expand and contract whereby the seal is maintained during thermal cycling. The member also includes a plastic grommet having an annular vent designed to open at very high pressures whereby said seal member is particularly useful in alkaline cells having little or no mercury whereby high internal pressures can develop.

42 Claims, 4 Drawing Sheets

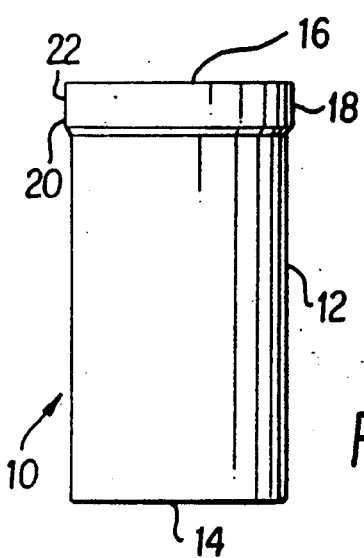
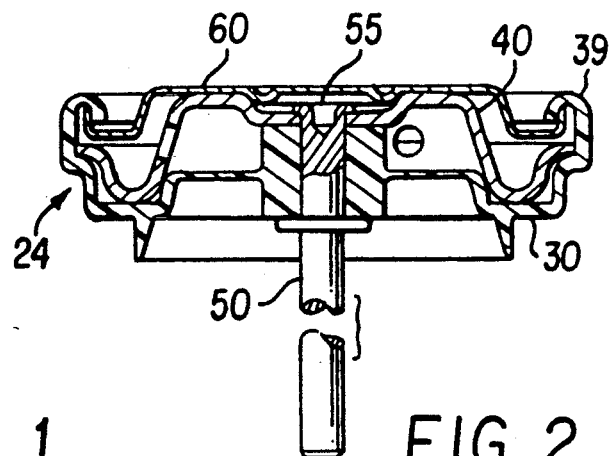
FIG.1  FIG.2
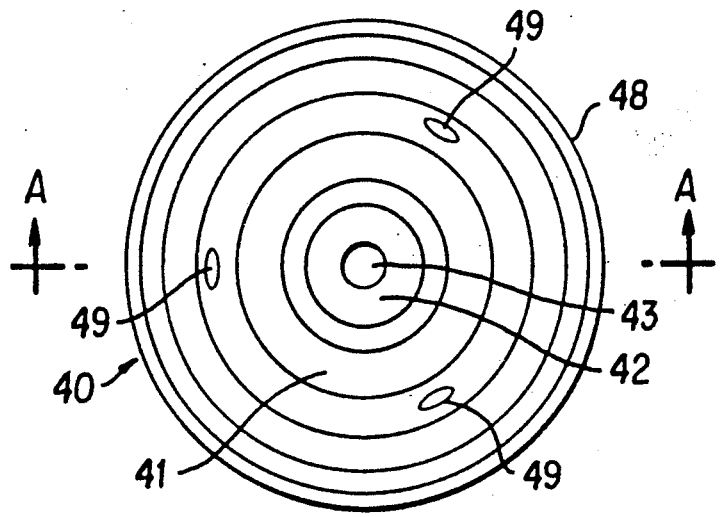
FIG.3
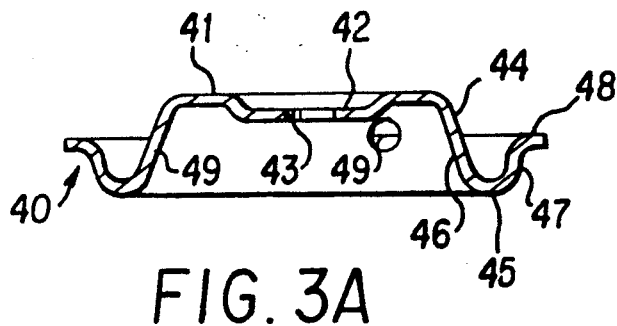
FIG.3A
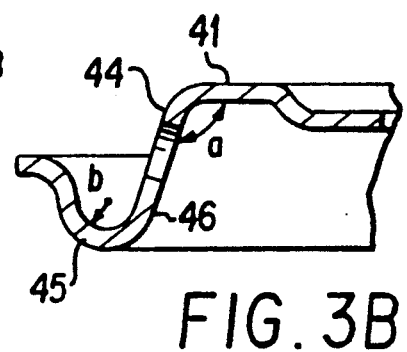
FIG.3B

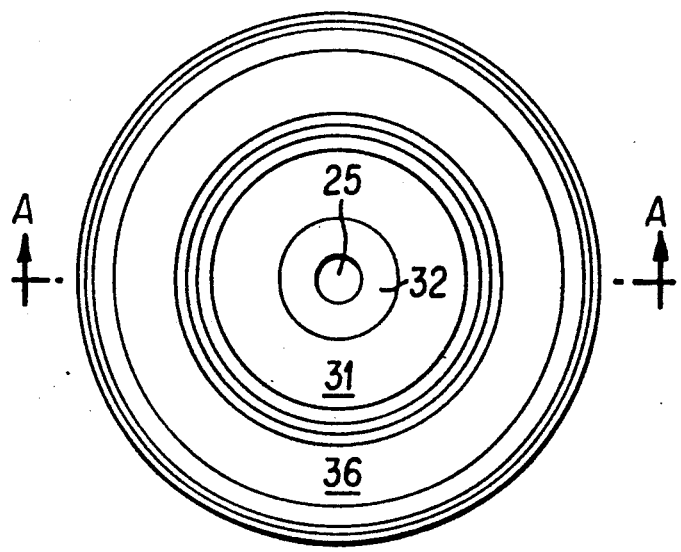
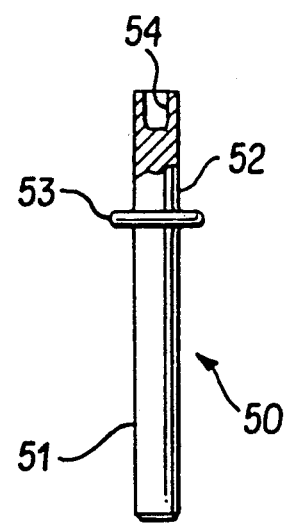
FIG.4  FIG.5
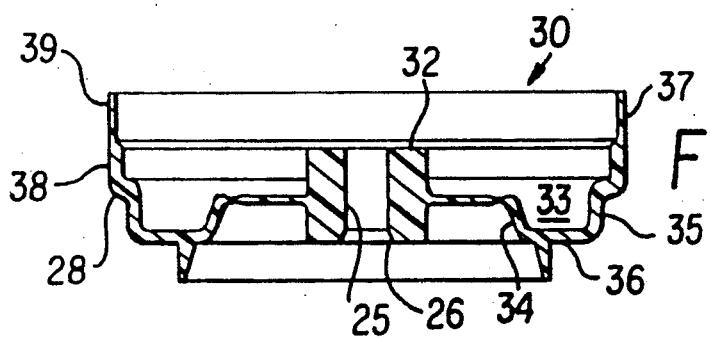
FIG.4A
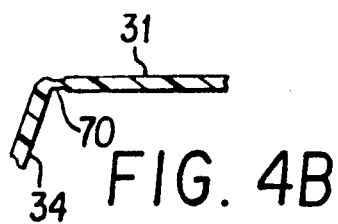
FIG.4B
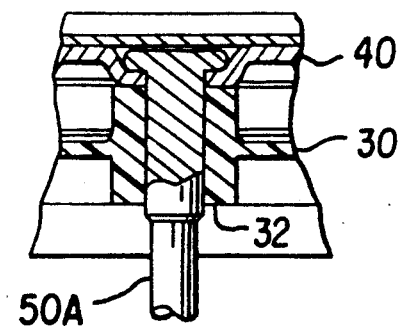
FIG.6
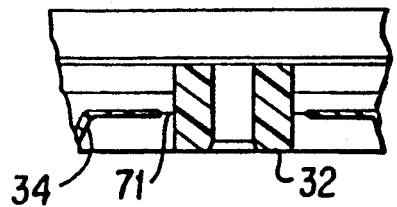
FIG.4C

HIGH PRESSURE SEAL FOR ALKALINE CELLS

This invention relates to a seal that is adapted to close the open end of an electrochemical cell casing. In particular, the present invention relates to a seal for cylindrical alkaline cells which can develop high internal pressures, such as cells which have zinc anodes containing little or no mercury.

In the past, zinc anodes used in alkaline cells have contained mercury to retard hydrogen generation. However, environmental concerns over mercury leakage from cells disposed of in landfills has increased efforts to eliminate mercury. The present invention relates a seal design capable of tolerating high internal hydrogen pressure. The present invention is, of course, equally suited for use in cells which contain mercury.

Cylindrical alkaline cells are sealed by placing a seal (such as that shown and described in U.S. Pat. No. 4,670,362) onto a bead formed just below the upper open end of the cell casing and crimping the upper end of the casing inwardly and over the outer periphery of the seal to compress it against the bead. After the seal is crimped in place, a nail-like current collector is forced down through a central opening. The seal must have sufficient mechanical integrity to withstand the forces which are needed to drive the nail through the central opening in an interference fit. Therefore the seal member must be fairly thick so that it does not deflect inwardly when the nail is driven through.

A seal such as the one described above has two potential areas where leakage can occur. These are between the cell casing and the seal and between the seal and the current collector. Due to the differences in the coefficients of expansion between metal and plastic, leakage problems are exacerbated when the cell is subjected to temperature fluctuations.

Most alkaline cell seals also have a vent designed to open at a predetermined pressure. If the vent were to fail to open there is also a pressure, higher than the vent pressure, which can dislodge the seal from the cell casing. This is called the decrimping pressure. Most cells are designed so that the decrimping pressure is sufficiently greater than the venting pressure to ensure that the vent will open first. In cells having low mercury content much higher internal pressures are encountered than in present commercial cells. Thus, a cell design for low mercury content cells must not only have a vent capable of managing high internal pressures, but must also have a crimp design which can maintain even higher pressures.

Radially crimping a seal into place is an alternative to the beaded crimping method described above and generally creates a much tighter seal. In this crimping method a portion of the cell casing wall at the open end is expanded. A seal member fits closely within the expanded opening. The seal member includes a metal disc which fits within a circular outer wall of a plastic grommet. The expanded portion of the casing is reduced back to its original size whereby a radial force causes the metal disc to bite into the grommet wall. U.S. Pat. No. 3,069,489 discloses a radially crimped seal like the one just described. That patent states that the plastic grommet must be made from a material which has good cold-flow characteristics so that over time the amount of plastic material flowing out of the seal area due to the compressive force is minimized. The patent states that the seal described maintained its integrity over several months. Today, however, alkaline cells must remain tightly sealed for up to five years. Thus, a problem with a radially crimped seal is that even with materials having good low flow characteristics there is still some flow which takes place over long time periods and the seal becomes less effective.

The present invention solves this problem by using as a component of the seal member a metal support which has a spring means in its outer portion whereby the spring means is placed under partial compression in a radially crimped cell. Thus, any cold flow of the plastic grommet is compensated for by expansion of the spring. Further, the spring means is capable of expanding or contracting as the ambient temperature changes so that a tight seal is maintained. The spring portion is designed so that it will be placed under compression within its elastic limit so that it will continue to exert a radial, outwardly directed pressure upon the plastic grommet to provide a leak-proof seal despite temperature fluctuations.

The present invention provides a reliable high pressure vent in the plastic grommet. The plastic grommet has a central disc portion with an axial boss at its center. An annular vent in the form of a ring shaped membrane is located in the central disc portion encircling the boss. It has been discovered that such vent membrane is preferred over the small circular type because it is more reliable at high pressure. The annular vent is also desirable because it opens a larger area for the escape of vented gas. The present vent is not easily plugged by escaping cell contents as is a small vent membrane. It is particularly important that a cell whose vent pressure is 600 psi or higher has a large vent opening which cannot be plugged. An additional advantage to the annular vent groove is that it is easier to injection mold the grommet. The annular vent groove gives uniform symmetry to the grommet so that an injection mold having a central gate can be used. The small circular vent membranes used heretofore make the grommet asymmetric and result in a more difficult injection molding process.

In a preferred embodiment, the seal is preassembled to provide an integrated part which can be handled as a single element during cell assembly. The plastic grommet has an outer circumferential wall with said metal support fitting closely therewithin. The metal support member and the plastic grommet each has a centrally located aperture. A current collector passes through centrally located apertures in both the metal support member and the plastic grommet and holds the support and the grommet together. A circular terminal end cap is located on top of the metal support making mechanical and electrical contact thereto. The end cap has an upwardly extending outer wall with the outer wall of the grommet folded inwardly and over the end cap outer wall thereby holding the latter in place. Thus, an integrated assembly is provided which is sized to snugly fit into the flared opening of a cell casing just prior to radial crimping.

An integrated seal has many advantages not already mentioned. For example, no additional manufacturing steps are required after the member is crimped in place. Thus, there is no possibility of disrupting the seal once it is formed. This is in contradistinction to the type of seal wherein a nail is driven through a plastic grommet after the grommet is in place. Another is that a better seal between the current collector and the boss is obtained. In accordance with the present invention the seal between the current collector and the boss is made without the possibility of any electrolyte being trapped therebetween, as can occur when a nail-type collector is inserted through a plastic grommet that is sealed in place. Any electrolyte trapped in this manner enhances the wicking of electrolyte from within the cell and results in leakage.

The present invention further provides a high decrimping pressure by having a high degree of roll-over of the upper edge of the cell casing over the outer wall of the endcap. For example, a seal in accordance with the present invention can be designed so that pressures in excess of 1500 psi are required to decrimp the cell.

The present invention provides a galvanic cell with an integrated seal which, depending upon the size and type of cell being sealed, may have a variety of precise configurations, whereby the desired characteristics described above, and others, may be accomplished.

These, and other features and objects of the invention are, however, more fully described hereafter in association with the accompanying drawings, in which:

FIG. 1 is a side view of a cell casing;

FIG. 2 is a cross sectional view through an integrated seal made in accordance with the present invention;

FIG. 3 is a top view of a metal support member made in accordance with the present invention;

FIG. 3A is a cross sectional view through the metal support member shown in FIG. 2 taken along line A—A;

FIG. 3B is an enlarged portion of the cross sectional view shown in FIG. 3A;

FIG. 4 is a top view of a plastic grommet;

FIG. 4A is a cross sectional view through the plastic grommet shown in FIG. 4 taken along line A—A;

FIG. 4B is an enlarged view of the cross section contained within the circled portion shown in FIG. 4A;

FIG. 4C is a cross section through the central portion of an embodiment of a plastic grommet having the vent membrane adjacent to the boss;

FIG. 5 is a cross-sectional view through a rivet-type current collector;

FIG. 6 is a cross sectional view through the central region of an integrated seal having a nail-type curent collector;

Figure 7:
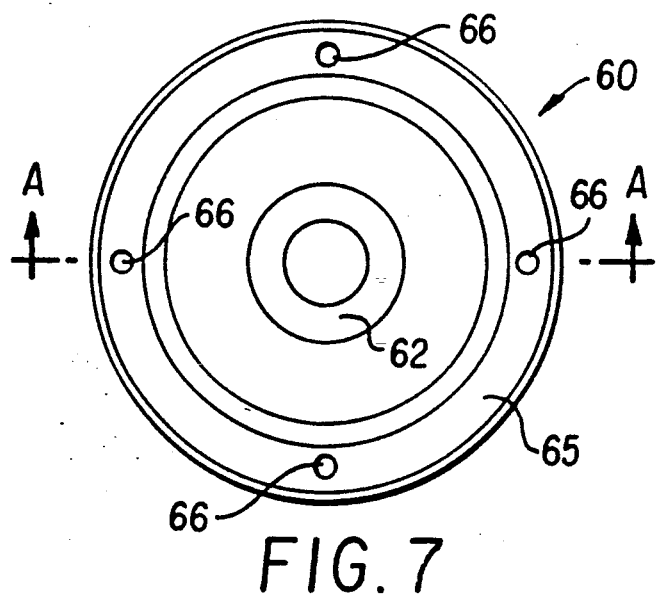
FIG. 7 is a top view of a terminal end member.

Referring now to FIG. 1, cylindrical cell casing 10 is provided with cylindrical wall 12 having a closed end 14 and an expanded (or stepped) portion 18 at its upper, open end 16. For a "AA" size cell the diameter of expanded portion 18 is about 0.02 inch greater than the diameter of the main casing body. For cell sizes larger than "AA", such as "C" or "D", the expanded portion is about 0.03 inch greater. For larger cell sizes such as "C" and "D" it is preferred that the wall thickness of casing 10 be about 0.012 inch, whereas for smaller cell sizes such as "AA" and "AAA" it is preferred that the wall thickness be about 0.01 inch. Casing 10 can be made from suitable materials such as cold rolled steel, stainless steel, and nickel plated cold rolled steel. The height of expanded portion 18 is sufficient so that when an integrated seal assembly is seated on the step 20 the upper end 22 of portion 18 can be folded in and over the periphery of the seal member. The inside diameter of portion 18 is about the same, or slightly larger than, the initial, outer diameter of the integrated seal assembly.

The embodiment of the present invention shown in FIGS. 2-8 is designed to be used for cell sizes larger than "AA", such as "C or D". "AA" size and smaller cells require slight modifications to provide a seal having the same characteristics as the one depicted. These modifications are discussed the description of FIGS. 2-8.

Referring now to FIG. 2, integrated seal assembly 24 comprises a plastic grommet 30 and a metal support 40 held firmly together by a rivet-type current collector 50 and a negative terminal end cap 60 that is in electrical contact with collector 50; either directly, or, as shown, indirectly through physical contact with metal support 40. End cap 60 is held in the assembly by the upper outer wall 39 of grommet 30 which is turned inwardly and over the periphery of end cap 60.

Referring now to FIGS. 3 and 3A, metal support 40 comprises a central disc portion 41 with a circular depressed portion 42 formed centrally therein and a centrally located aperture 43. Depressed portion 42 acts to strengthen the metal support 40, and particularly prevents the central disc portion 41 from doming, i.e. deflecting outwardly, when inwardly directed radial compressive forces are applied to the edge of support member 40 during cell assembly. Depressed portion 42 also serves to prevent metal support 40 from bulging outwardly under high internal pressures.

In a preferred embodiment, an outwardly extending, annular, "U"-shaped channel 45 is attached at the outer edge of the central disc portion 41. Channel 45 functions as a spring which becomes partially compressed when the radial crimp is formed. Thus, when the assembled cell is subjected to thermal fluctuations, channel 45 can expand or compress further thereby maintaining an outwardly directed sealing pressure at all times. "U"-shaped channel 45 is formed by inner wall 46 and outer wall 47.

Radial flange 48 extends outwardly from the upper portion of outer wall 47. In a crimped cell, a portion of grommet 30 is squeezed between radial flange 48 and the portion 18 of casing 10. It is in this area that a tight seal is made and maintained as the spring means expands and contracts despite temperature fluctuations. It is preferred that flange 48 has a diameter which is less than the inner diameter of lower cylindrical wall 12 of casing 10. Thus, when support member 40 is radially crimped in place it is not possible for the support to cut through an interposed portion of the plastic grommet.

"U"-shaped channel has a true radius "b" as shown in FIG. 3B. This shape imparts good spring characteristics to the channel which in turn maintains a good seal during temperature fluctuations. If the "U"-shaped channel was narrower and deeper than the one shown it would permanently deform more readily. It is also preferred that the angle "a" formed between leg 46 and central disc portion 41 is between about 100° and 115°. Such angle permits skirt 44 and channel inner wall 46 to move inwardly when inwardly directed radial compressive forces are applied, and helps to prevent the central disc portion 41 from flexing upwardly during crimping. The inward movement of skirt 44 is assisted by keeping the depth of channel 45 at about one half the height of metal support member 40. However, other shapes of the channel and other angles between the skirt and disc portion which will provide similar sealing characteristics are within the scope of the present invention.

In a preferred embodiment metal support 40 is made of nickel plated, cold-rolled steel having a thickness of about 0.02 inch. Other suitable materials include cold rolled steel, hot rolled steel, stainless steel, steel alloys, and beryllium copper.

It is preferred that metal support 40 be provided with a means for releasing the vented gas which escapes when the cell vents (discussed further below). In one embodiment a plurality of apertures 49 is provided, equally spaced, in skirt 44 (see FIGS. 3 and 3A). Thus, when the vent in grommet 30 ruptures apertures 49 provide a passageway for the exiting gases.

Referring now to FIGS. 4 and 4A the details of grommet 30 will be explained. FIG. 4A shows a cross section through circular plastic grommet 30 taken along the line A—A in FIG. 4. The diameter of grommet 30 is such that it fits closely within flared opening 18 of cell casing 10. Grommet 30 comprises a central disc portion 31 and an axially extending boss portion 32 at the center of disc portion 31. Boss portion 32 has an axial aperture 25 therethrough. A chamfer 26 can be provided for easier insertion of a current collector through aperture 25. A "U"-shaped annular channel 33 is connected to disc portion 31. Channel 33 is comprised of an inner wall 34, an outer wall 35, and a bottom wall 36 whereby the upper edge of inner wall 34 is connected to the periphery of central disc portion 31. The particular shape of channel 33 depends on the shape of channel 45 in metal support member 40 since channel 45 fits within channel 33 in the assembled seal (see FIG. 2). Thus, any shape for channel 33 which will accommodate the particular shape of channel 45 is within the scope of the present invention.

An outwardly directed shoulder 28 is connected to the upper edge of outer wall 35 of channel 33. An upwardly extending circumferential wall 37 is connected to the outermost portion of shoulder 28. Circumferential wall is comprised of an upper portion 39 and a lower portion 38. The outer diameter of shoulder 28 is approximately equal to, or slightly less than, the inner diameter of step 20 in casing 10. Thus, the engagement of shoulder 28 on step 20 when assembly 24 is inserted in the open end of casing 10 acts as a support for the assembly both before and after radial crimping. The inner diameter of lower wall portion 38 is approximately equal to, or slightly greater than, the outer diameter of metal support 40. Thus, metal support 40 fits snugly within grommet 30.

Since the mechanical strength of the integrated seal member herein described is provided by metal support 40, grommet 30 does not need to have a thickness which provides mechanical strength as in prior art cell tops. Therefore, the various portions of grommet 30 which have a surface exposed to the interior of the cell can be made thin so that an appreciable amount of hydrogen permeation through the grommet portions can take place. Thus, a means is provided to bleed off internal hydrogen gas pressure without venting taking place. Hydrogen permeation can be further enhanced by the proper choice of material from which to fabricate grommet 30. Specific materials which enhance hydrogen permeation are discussed more fully below.

In accordance with the present invention, the portions of grommet 30 which are available for hydrogen permeation from within the cell are central disc portion 31 and the walls 34, 35 and bottom 36 of channel 33. It is therefore desirable to have these portions of the grommet thin enough so that hydrogen permeation is enhanced. Thus, the actual surface area available for permeation is greater than the apparent surface area of the grommet. In one embodiment the thickness of portions 34, 35, and 36 is about 0.02 inch. In another embodiment annular disc is about 0.015 inch thick while the other portions are 0.02 inch thick. This latter embodiment allows for even greater hydrogen permeation through annular disc 31 than the former embodiment where disc 31 is 0.02 inch thick. The lower limit for thickness in all areas is about 0.01 inch since below this it is difficult to mold the part and it is difficult to control the venting pressure. The upper limit is defined by the desired hydrogen permeability, but a practical upper limit which still has reasonable hydrogen permeability is about 0.03 inch. Thus, in distinction with most prior art plastic grommets, the present invention uses a plastic grommet which is not a structural part.

The thickness of lower wall portion 38 is greater than one half the difference between the diameter of support member 4 and the inner diameter of casing 10. Thus, when seal 24 is radially crimped into place radial flange 48 bites into wall portion 38. It is preferred that the strain on the plastic in this area under the stress imparted by compression between flange 48 and casing wall 20 is within the elastic limit of the plastic at the time the crimp is formed. It is preferred that flange 48 does not compress wall portion 38 by more than 50% of its original thickness and it is more preferred that it is not compressed by more than 25% of its original thickness. The degree to which wall 38 is compressed depends on the type of plastic used, the thickness of wall 38, and the difference between the diameter of metal support 4 and the inner diameter of casing 10. However, once the plastic material is chosen it is within the skill of the artisan to optimize the other two values so that the plastic remains within its elastic limit.

The plastic material chosen must have a compressibility such that it remains within its elastic limit while it the same time being hard enough to place spring means 45 under compression. Materials suitable for use in the present invention include nylon, nylon alloys, polysulfone, and filled polypropylene.

As used herein the term "nylon" encompasses a variety of different materials in the nylon family. Varieties of nylon ar generally characterized by the length of the carbon chains in the diamine and the diacid which are used to prepare the polymer. Nylon 6-6 is prepared by the reaction of hexamethylenediamine (six carbon atoms) with hexanedioic acid (six carbon atoms). Nylon 6-12 is prepared from the same diamine as is nylon 6-6, but reacted instead with dodecanedioic acid having 12 carbon atoms. Nylon 12-12 is prepared from a dodecamethylenediamine and a dodecanedioic acid each of which has 12 carbon atoms. All of the above nylons or their alloys are useful for fabricating plastic grommet 30. Nylon is known to absorb moisture and it is preferred that the plastic grommets are fully moisturized after forming. This is generally done by boiling.

Nylon can be alloyed with a variety of polymers, non-limiting examples of which are other nylons, polyethylene, polypropylene, ABS, and polysulfone. Alloys of the above mentioned nylons with these and other polymers are encompassed by the present invention.

While all of the above mentioned materials are useful from a strength viewpoint, it has been discovered that certain of these materials have a high hydrogen permeability. Such materials are preferred for cells having anodes with little or no mercury wherein significant quantities of hydrogen gas can be generated. As described above, portions of plastic grommet 30 are made thin in order to enhance hydrogen permeation. Nylon 6-6 has the poorest hydrogen permeation, being about 1 cm$^3$ H$_2$(@STP)·cm/S·cm$^2$·cm Hg. It is preferred that materials having at least three times this permeability be used in low mercury content cells. Plastics with at least three times the hydrogen permeability of nylon 6-6 include nylon 6-6/ABS alloys, nylon 6-12, alloys comprising nylon 6-12, nylon 12-12, alloys comprising nylon 12-12, mineral filled polypropylene and alloys thereof, and polysulfone and alloys thereof.

The following Table lists some of the preferred materials and their hydrogen permeability. Unless otherwise specified the nylon containing materials are fully moisturized. The units of permeability are cm$^3$ H$_2$(@STP)·cm/S·cm$^2$·cm Hg.

| Material | Permeability |
| --- | --- |
| nylon 6-6/ABS (50/50) | 6.1 |
| nylon 6-12 | 4.4 |
| nylon 6-12 (dry) | 5.5 |
| nylon 12-12 | 3.2 |
| 20% talc filled polypropylene | 14.5 |
| nylon 6-12/12-12 (50/50) | 4.4 |

Even when plastics having high hydrogen permeability are used to mold grommet 30 it is still necessary to include a vent means whereby excessive pressures can be relieved more quickly. In accordance with the present invention it is preferred that the vent be located in central disc 31. However, it is also feasible to locate the vent in inner channel wall 34. Referring now to FIGS. 4, 4A and 4B there is shown an annular vent 70. FIG. 4B shows in cross section the profile of vent section 70. The Figures show that the reduced thickness of vent section 70, as compared to adjacent portions of annular disc 31, is obtained by including an annular groove in both the top and bottom surfaces of central disc 31 wherein the grooves are coincident. Each groove has a depth of less than one half the thickness of central disc 31 whereby a thin membrane remains between the grooves. It has been discovered that a vent membrane formed in this manner is more reliable than a membrane of the same thickness but formed by a groove in only one side. Such design is also preferred because venting occurs at a lower internal pressure than if the notch was taken out of either the bottom or the top of annular disc 31. However, vent 70 could be designed so that its thickness is obtained by forming the notch in either the bottom or the top surface of annular disc 31 and changes in the thickness of vent 70 would lower the burst pressure to more acceptable levels.

FIGS. 4A and 4B show a preferred location of annular vent 70 in the outer periphery of central disc 31. When vent 70 ruptures, annular disc 31 disconnects from inner wall 34 of channel 33 and disc 31 can flex upwardly and inwardly while being hinged to boss portion 32. Although less desirable, vent 70 could be located anywhere on disc 31 interior to the position shown in FIGS. 4A and 4B. FIG. 4C shows an embodiment wherein the vent 71 is directly adjacent to boss 32. In this embodiment the presence of boss 32 on one side of the vent membrane creates a shear force on the membrane when internal pressure is applied. The shear force actually causes the membrane to rupture at a lower internal pressure than when the membrane is located in the periphery of disc portion 31. Thus, membrane 71 should be made thicker when it is located as shown in FIG. 4C. A potential problem of locating annular vent 71 as shown is that when the vent ruptures there is an outer portion of central disc 31 which stays attached to inner channel wall 34 and which can flex upwardly and outwardly, being hinged by the connection to wall 34. Such an embodiment could cause the flexed portion of disc 32 to block off openings 49 provided in metal support 40 for passage of vented gas. Therefore, apertures 49 may have to be relocated to prevent this from happening.

It is preferred that the thickness of grommet 30 in the area of shoulder 28 is greater than other portions of the grommet so that extra material is provided where shear forces are exerted on shoulder 28 during radial crimping. Thus, it is desirable to have the thickness of shoulder 28 be about 0.03 inch. Increasing the thickness of shoulder 28 serves to improve the reliability of crimping the cell and not having any fractures occur in grommet 30 due to the shear forces created during crimping. It is within the scope of the present invention, however, that shoulder 28 is the same thickness as the walls of channel 33. This latter embodiment retains all of the sealing and venting characteristics as the embodiment having a thicker shoulder portion 37.

Upper outer wall 39 is preferred to be about half the thickness of lower outer wall 38. When integrated top assembly 24 is assembled upper outer wall 39 is heat-formed inwardly and over the periphery of negative end cap 60 thereby holding negative end cap in place until the radial crimp is formed (discussed further below). Having upper outer wall 39 thinner makes it easier to carry out the heat-forming step.

FIG. 4A shows a downwardly dependent skirt portion 27 connected to lower channel wall 36. Skirt portion 27 is not required for sealing the cell but rather is a common feature in alkaline cell seals and is used to contain the upper edge of the cell separator (see FIG. 8). The separator is usually formed as a cylinder whereby the upper end of the cylinder fits within the inner circumference of skirt 27. Other designs of such skirt portions are possible and could be incorporated into the seal described herein.

Grommet 30 and metal support 40 are shaped so that they engage as shown in FIG. 2. The diameter of radial flange 48 is about the same, or slightly less than the inside diameter of lower outer wall 38 of grommet 30. Radial flange 48 rests on shoulder 28 and is in contact with lower outer wall 38. Depressed portion 42 of metal support 40 rests on top of boss 32 of grommet 30 such that the aperture in each part align. "U"-shaped channel 45 of metal support 40 rests within annular channel 33 of grommet 30.

Metal support 40 and grommet 30 are firmly held together by rivet 50 (FIG. 2). FIG. 5 shows a sideview of an embodiment of a rivet for use in the present invention. Rivet 50 comprises an upper shank 52, a flange 53, and an indentation 54 in the end of upper shank 52. The diameter of upper shank 52 is about the same as, or slightly larger than the inner diameter of axial aperture 25 in boss 32 such that a tight fit results. The upper shank 52 is inserted through axial aperture 25 in boss 32 from the underside of grommet 30 until flange 53 contacts the underside of boss 32. The upper end of shank 52 extends above the top of boss 32. Metal support 40 fits inside grommet 30 such that the upper end of shank 52 projects through aperture 43 of support member 40. The assembly is completed by forming rivet head (55 in FIG. 2) using indentation 54 in upper shank 52. FIG. 2 shows the completed assembly. It is preferred that rivet head 55 does not project above the upper surface of central disc 41 in metal support 40.

Since rivet 5 is the electrical feedthrough between the negative terminal and the anode inside the cell a current collector is also connected to rivet 50. An embodiment of a current collector is shown in FIG. 5. Lower shank 51 extends downwardly from flange 53. The length of shank 51 is such that, in an assembled cell, it projects into a centrally located anode of a cell such as a primary alkaline cell. Other embodiments for the current collector are possible and depend on the particular design of the anode to which contact is made. The embodiment shown in FIG. 5 can be machined from a single piece but for more complex current collector structures the current could be made separately and then welded or riveted to flange 53.

Once grommet 30 and metal support 40 are riveted together a leakproof seal is created between flange 53 and boss 32 whereby electrolyte leakage past this seal is precluded. While this compression seal is fully adequate, it may be desirable to also include a sealant material in this area. Thus, before rivet 50 is inserted through grommet 30 a bead of sealant material is applied on flange 53. Thus when the rivet is inserted and the rivet head is made a layer of sealant material is interposed between flange 53 and boss 31 as well as sealant filling chamfer 26 of plastic grommet 30. Non-limiting examples of suitable sealants include polyamides and bitumen.

Since rivet 50 is in physical contact with the anode and the electrolyte it must be made from a material which is chemically compatible with the electrolyte and anode. Brass is a preferred material when the anode is zinc and the electrolyte is a KOH electrolyte. Other suitable materials include nickel-silver, silicon-bronze, and copper.

An alternative current collector to the rivet-type just described is a conventional nail-type current collector. A nail-type collector does not give the same axial compression seal at the boss as the rivet does so it is less suitable for cells with little or no mercury in the anode. However, for cells having 1% or more mercury a nail-type collector provides an adequate seal. FIG. 6 shows a cross section through the middle portion of a seal wherein a nail-type collector 55 is used to hold metal support 40 and plastic grommet 30 together. I this embodiment the apertures in boss 32 and metal support 40, through which current collector 55 passes, are sized so that a tight interference fit is created with the nail shank. The tight interference fit between the inner surface of the aperture through the boss and the surface of the nail shank creates a seal therebetween. Additionally, an amount of sealant can be applied at the upper end of boss 32 before the nail is inserted. Thus, when the nail is inserted the sealant is drawn down between the nail and the boss whereby any leakage paths are effectively blocked off.

In a preferred embodiment, an integrated seal of the present invention is completed by fixing terminal end member 60 into place as shown in FIG. 2. Alternatively, the assembly of grommet 30, metal support 40, and current collector 50 can be inserted into the open end of the cell casing first and then end member 60 can be placed in position immediately prior to crimping.

Figure 7A:
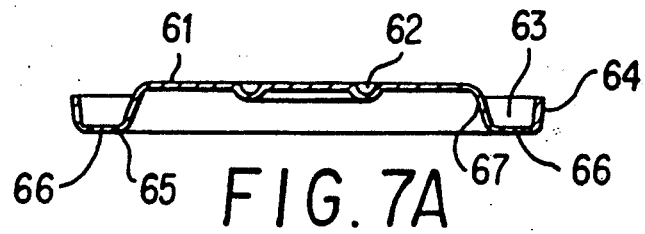
FIG. 7A is a cross sectional view through the terminal end member shown in FIG. 7 taken along line A—A.

Referring now to FIG. 7 and 7A there is shown a metal circular terminal end member 60 which is the external negative electrical contact of the cell. Terminal member 60 has a outer diameter which is less than the outer diameter of metal support member 40. Thus, when seal 24 is crimped in place and the diameter of metal support member 40 is reduced there is substantially no radial force exerted on terminal member 60.

Terminal member 60 is comprised of a central platform region 61 and an annular "U"-shaped channel 63 attached thereto. Platform region 61 may have an annular groove 62. Annular groove 62 has a diameter such that it nests inside central depression 42 of metal support 40 as shown in FIG. 2. This arrangement serves to locate terminal member 60 onto metal support 40 during assembly before upper wall 39 of plastic grommet is heat formed inwardly to hold terminal member 60 in place.

Annular channel 63 is comprised of an inner wall 67, an outer wall 64, and a bottom wall 65. Inner wall 67 is connected to the periphery of platform region 61. Bottom wall 65 has a plurality of apertures 66 therein. These apertures complete the passageway for vented gases to escape from the cell when the vent membrane 70 ruptures. While FIGS. 7 and 7a show these apertures located in bottom wall 65 of channel 63, they could also be located in inner wall 67. This latter embodiment is shown in terminal member 60 shown in FIG. 2.

Figure 8:
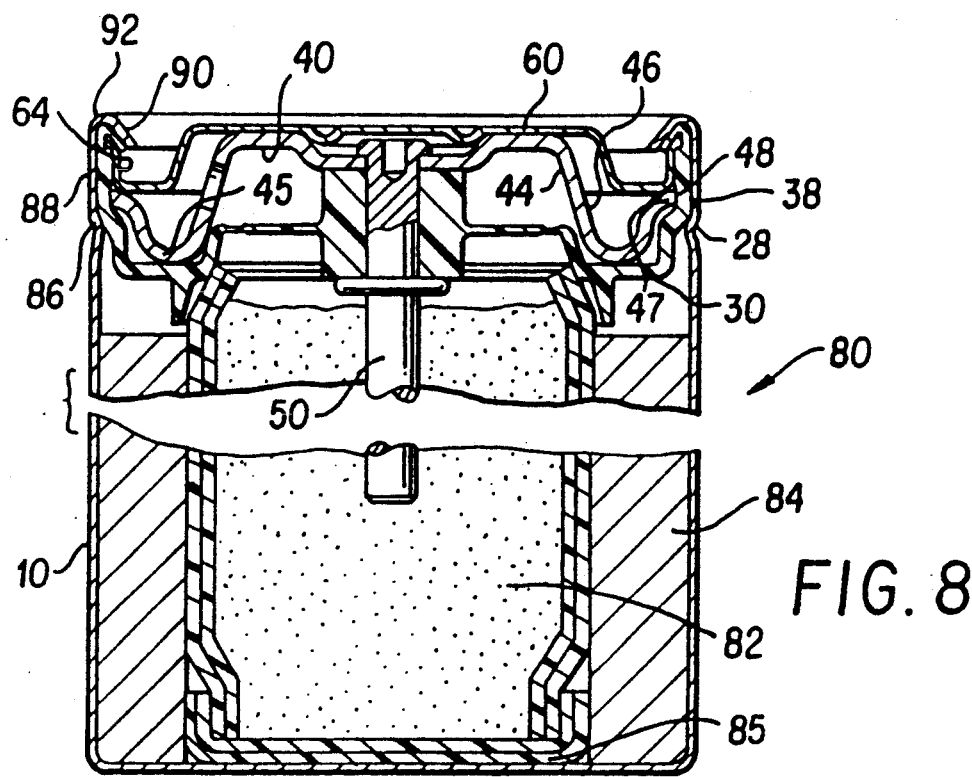
FIG. 8 is a cross sectional view through an electrochemical cell made in accordance with the present invention.

The height of channel inner wall 67 is such that when platform region 61 is resting on central disc portion 41 of metal support 40 the lower surface of bottom wall 65 does not contact flange 48 of metal support 40. This arrangement is seen in FIG. 2. The purpose of this separation is to prevent any upward forces from being exerted on terminal member 60 by radial flange 48 when the seal is radially crimped. The outer edge of radial flange 48 is bent slightly inwardly and upwardly when the radial crimp is made. Thus, the separation of channel bottom wall 65 from radial flange 48 allows some upwards movement to take place without pushing up on terminal member 60. For the seal depicted in FIG. 2 the distance of separation is about 0.01 inch. It is preferred that the separation distance is kept at a minimum so that radial flange 48 just touches channel bottom wall 65 when the radial crimp is formed as shown in FIG. 8. Any greater separation would waste head space inside cell.

End terminal 60 makes mechanical and electrical contact to metal support 40 as shown in FIG. 2. The outer portion of platform 61 of terminal member 60 is in contact with the outer portion of central disc portion 41 of metal support 40. As will be discussed below, end terminal 60 is held tightly against metal support 40 by a rolled over portion of casing 18. However, contact in this area can be further guaranteed by either welding the parts together or by interposing a conductive grease, conductive epoxy, or like material between the surfaces. In all of these embodiments the conductive path is from the anode to the current collector, from the current collector to the metal support, and from the metal support to the end terminal. An embodiment having a slightly different conductive path is obtained by placing an amount of conductive epoxy or like material in central depression 42 of metal support 40 whereby the head of current collector 50 is covered and the epoxy makes contact to the center portion of terminal member 60. This embodiment creates an additional conductive pathway from the anode to the current collector, from the current collector to the conductive epoxy, and from the conductive epoxy to terminal member 60. Thus, a variety of arrangements are possible for electrically connecting end terminal 60 to metal support 40 and all are within the scope of the present invention.

End terminal member 60 is preferably made from a metal having a shiny surface. Such a requirement is for cosmetic purposes since end terminal 60 is the visible element of the seal after being crimped in place. A suitable material is nickel plated cold rolled steel wherein the formed member is plated with nickel either before or after forming.

Once the end terminal member 60 is located in place on metal support 40, the integrated seal 24 can be completed by heat forming upper edge 39 of grommet 30 inwardly and over outer wall 64, as shown in FIG. 2. The heat forming step can be carried out using conventional tooling for heat forming plastics.

Reference will now be made to FIG. 8 which shows a cross section of an electrochemical cell having a seal radially crimped in place in accordance with the present invention. Electrochemical cell 80 comprises a cylindrical casing 10 with an anode 82, a cathode, 84, and a separator 85 between said anode and cathode contained therein. Radially crimped into the upper end of the cell casing is an integrated seal such as is shown in FIG. 2.

Cell casing 10 has an indentation 86 formed in the upper end thereof. Indentation 86 is an artifact of step 20 (FIG. 1) being radially crimped inwardly and serves as a support for shoulder 28 of grommet 30 whereby downward movement of the seal is precluded. Cell casing 10 further comprises an upwardly extending wall portion 88 connected to indentation 86 which portion is the sealing area of cell 80. Wall portion 88 is the end-product of reducing the diameter of portion 20 (FIG. 1) by radial crimping. Adjacent to the inner surface of wall portion 88 is a compressed portion of lower outer wall 38 of grommet 30. Lower outer wall 38 is compressed between wall portion 88 and radial flange 48 of metal support 40. In accordance with the present invention, spring means 45 (FIG. 3A) is under partial compression within its elastic limit.

Comparison of the metal support members shown in FIGS. 2 and 8 reveals that the diameter of support 40 has been reduced and the outer edge of radial flange 48 has moved slightly upwardly toward terminal member 60 in the crimped cell. The inner portion of flange 48 is turned downwardly which causes the lowest portion of channel 45 to be pushed downwardly. Skirt 44 and inner channel wall 46 have been pushed inwardly and, at the same time, walls 46 and 47 are compressed towards each other. The interaction of the downward movement of channel 45 and the inward movement of skirt 44 and wall 46 prevents any doming of the central portion of support 40 which would otherwise occur. All of the above described movements are designed to be within the elastic limit of the metal support structure. The tendency for these movements to relax exerts an outwardly directed compressive force by flange 48 against grommet wall 38.

Uppermost portion 90 of cell casing 10 is turned inwardly and over the inwardly formed upper wall 39 of grommet 30. It is important that the angle formed between wall portion 88 and upper portion 90 is less than 90° and preferably less than 60°. Such an angle imparts very high strength in holding the seal in place whereby very high internal pressures are required to decrimp the cell. Further, the foldover of upper casing portion 90 holds terminal end member 60 downwardly against metal support member 40 ensuring good electrical contact therebetween.

As shown in FIG. 8, the upper surface of terminal member 60 is recessed from rim 92 of casing 10. Since terminal member 60 is the negative electrical contact of cell 80 such an arrangement precludes a user from electrically connecting a cell in a backwards position to another cell. It is desirable to prevent this from happening since the reversed cell could be vented by the other cell or cells forcing current through the backwards cell. Generally, having the upper surface of terminal member 60 recessed from rim 92 by 0.002–0.004 inch is sufficient to accomplish the desired result.

Cells made in accordance with the present invention have decrimp pressures in the range of 1600 psi. The vent pressure is in the range of 600 psi whereas a conventional circular vent for similarly sized cells vents at about 400 psi. Thus, the present invention is better suited to manage the higher internal pressures associated with alkaline cells having little or no mercury in their anodes.

Extensive leak testing of radially crimped alkaline cells with 0% mercury in the anode and having a seal member in accordance with the present invention has demonstrated that the seal does not leak. Test cells have been subjected to a variety of environmental tests. Thermal shock tests have been carried out on undischarged cells with no leaks being detected. In contrast, 63% of cells made having a conventional beaded crimp and having 1.5% mercury in the anode showed signs of leakage. Thus, even greater leakage is expected with a beaded cell if the anode contains no mercury.

Undischarged cells made in accordance with the present invention and having 0% mercury were also subjected to a temperature and humidity test with temperature cycling. At the end of the four prolonged storage periods the cells were inspected periodically for leakage. None of the cells showed any signs of leakage. In contrast 37% of conventional cells made having a beaded crimp and 1.5% mercury in the anode showed signs of leakage.

Similar tests were performed using discharged cells which are known to generate higher internal pressures on storage than undischarged cells. Cells made in accordance with the present invention and without mercury were discharged until their original capacity was reduced by 25%. The cells were subjected to the thermal cycling test with no signs of leakage compared to discharged conventional cells with 1.5% mercury where 90% of the cells tested leaked.

The seal member described herein is readily adapted to fit all cylindrical cell sizes. However, because of the slim diameter of "AA" size and smaller size cells, there are some minor alterations which are preferred in order to maintain the same sealing characteristics.

Figure 9:
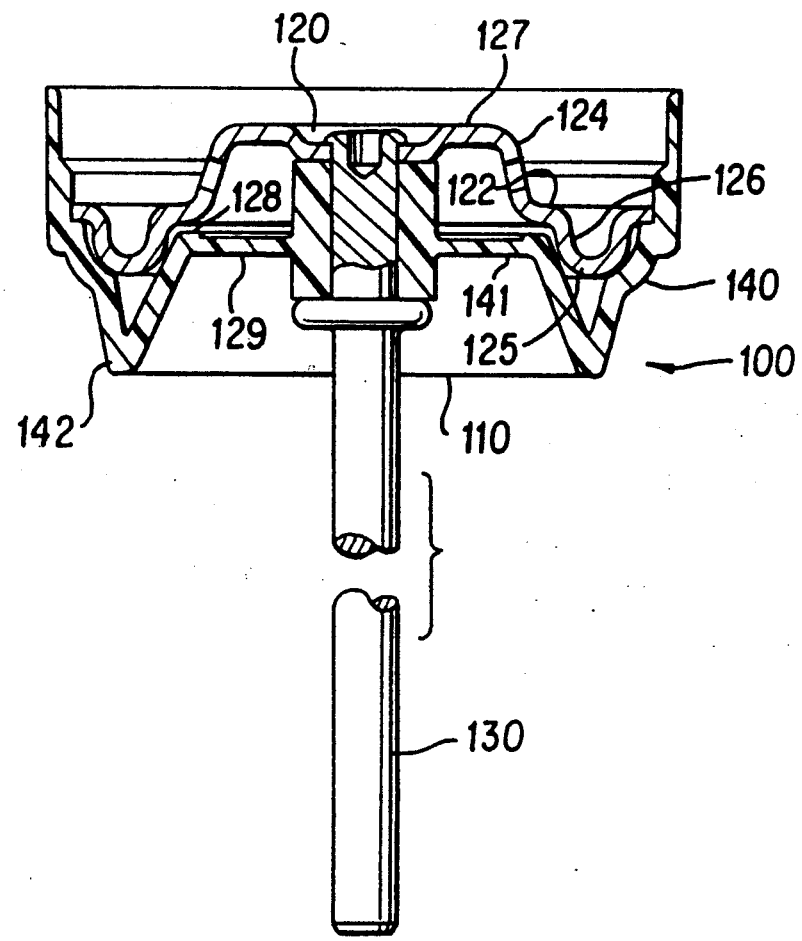
FIG. 9 is a cross sectional view through a seal preassembly showing an alternate embodiment.

Referring no to FIG. 9. there is shown a cross sectional view through seal preassembly 100, suitable for use in a "AA" size cell. Preassembly 100 is comprised of plastic grommet 110, metal support 120, and current collector 130 which holds grommet 110 and metal support 120 together. Preassembly 100 differs from the integrated assembly shown in FIG. 2 in the shape of metal support 120 and grommet 110. Although FIG. 9 does not show an end terminal member, the terminal member 60 shown in FIG. 2 would be suitable, downsized to the diameter for a "AA" size cell.

Metal support 120 comprises step 122 connected between downwardly dependent skirt and inner wall 12 of annular "U"-shaped channel 125. Step 122 provides a connection between skirt 124 and channel 125 Without having to change the angle between skirt 124 and central disc portion 127. As discussed above it is preferred that this angle is between 100 and 115°. If step 122 was not present this angle would have to be increased to greater than 120° to connect to inner channel wall 126 whereby the spring characteristic of the metal support member would be changed.

Step 122 has a secondary function which is to support outer disc portion 128 of grommet 140 as internal cell pressure increases. This arrangement prevents upwards movement of outer disc portion 128 whereby a shear force is created on vent 141 as central disc portion 129 is pushed outwardly. The shear force ensures that venting occurs at a given pressure more precisely than if outer disc portion 128 were not supported. For this reason the metal support shown in FIG. 3A for larger cells could also have a step included.

A drawback to the inclusion of step 122 is that it makes metal support 120 more difficult to form. The need for the step can be removed if the diameter of central disc portion 127 of the metal support were increased whereby connection to inner channel wall 126 can be made without having to change the angle between skirt 124 and disc 127. However, this is less preferred because a larger disc portion 127 leaves less room for roll over of the upper casing wall similar to that shown in FIG. 8. Nonetheless the sealing characteristics will be the same as the embodiment shown in FIG. 9. Thus, both the embodiment just described and the one shown in FIG. 9 are within the scope of the present invention.

FIG. 9 shows a V-shaped channel 142 as opposed to a squared "U"-shaped channel 33 (shown in FIG. 4A) in the plastic grommet. V-shaped channel 142 has a greater surface area than a "U"-shaped channel and therefore allows greater hydrogen diffusion. The choice between these or other shapes for the channel in the plastic grommet is a matter of preference for one skilled in the art. If hydrogen diffusion is important the V-shaped channel would be preferred but in other situations the "U"-shaped channel might be preferred. Since the shape of the channel does not effect the seal per se, any shape of the channel is within the scope of the present invention so long as it does not interfere with the integrity of the seal.

The above description is for illustration and explanation purposed and should not be interpreted to impose any limitations on the invention as claimed. Variations can be made by one with ordinary skill in the art and still remain within the scope of the claimed invention.

What is claimed is:

1. A sealing member for the open end of an electrochemical cell casing which includes a circular metal support member having a diameter such that it substantially covers the open end of a cell casing, said support member comprising a central disc portion and an outer section; said outer section being configured so that its lowest portion will move downwardly away from said central portion upon the application of inwardly directed radial compressive forces while the central disc portion is of sufficient strength to prevent concomitant upward movement of the center of the support member, wherein said lowest portion has a tendency to move upwardly upon the release of said compressive forces.

2. A sealing member for the open end of an electrochemical cell casing comprising a circular metal support member having a diameter such that it substantially covers the open end of a cell casing, said support member comprising a central disc portion; strengthening means disposed in said disc portion; and spring means located in the periphery of the member, whereby when said spring means is under inwardly directed radial compression the strengthening means prevents concomitant upward movement of the center of the support member.

3. The sealing member of claim 2 wherein said support member further comprises a downwardly and outwardly dependent skirt portion attached to the outer edge of the central disc portion and said spring means is attached to the lower end of the skirt whereby said skirt portion moves inwardly and said spring means moves downwardly under inwardly directed radial compressive forces applied to the outer edge of the support member, wherein said spring means has a tendency to move upwardly and said skirt has a tendency to move outwardly upon the release of said compressive forces.

4. The sealing member of claim 3 wherein said spring means comprises an annular U-shaped channel having an inner wall and an outer wall wherein said channel is attached by its inner wall to the lower end of the skirt whereby said inner and outer channel walls move closer together under inwardly directed radial compressive forces.

5. The sealing member of claim 4 wherein the height of the channel is about one half the height of the support member.

6. The sealing member of claim 3 wherein said support member further comprises a radial flange attached to the spring means wherein the outer edge of the flange is the sealing portion of the support member.

7. The sealing member of claim 3 wherein said strengthening means in the central disc portion comprises a circular depression having a diameter of not more than half the diameter of the disc portion.

8. A sealing member for the open end of an electrochemical cell casing comprising a circular plastic grommet having a diameter such that it fits closely within the opening of an electrochemical cell casing, said grommet comprising a central disc portion having an upper surface and a lower surface; an outer section; an axial boss portion located at the center and extending above and below the disc portion; and an annular vent membrane located in the disc portion and encircling the boss, wherein the membrane is formed between an annular groove in the upper surface of the disc portion and an annular groove in the lower surface of the disc portion coincident with the groove in the upper surface, wherein each groove is less than one half the thickness of the disc portion.

9. The sealing member of claim 8 wherein said annular vent is directly adjacent to the boss.

10. The sealing member of claim 8 wherein said annular vent is located in the outer periphery of the disc portion.

11. The sealing member of claim 8 wherein said member is made of a plastic comprising a member selected from the group consisting of nylon 6-6, nylon 6-12, nylon 12-12, polysulfone, mineral filled polypropylene, and alloys of these.

12. The sealing member of claim 8 wherein said member is made of a plastic having a hydrogen permeability of at least about 3 $cm^3$ $H_2$(@STP)·cm/S·$cm^2$·cm Hg.

13. The sealing member of claim 8 wherein said plastic grommet further comprises a U-shaped channel having an inner wall and an outer wall wherein said inner wall is attached to the central disc portion, wherein the central disc portion and the channel walls have about the same cross sectional thickness whereby the surface area available for hydrogen diffusion is greater than the apparent surface area of the grommet.

14. The sealing member of claim 13 wherein said grommet further comprises an outwardly directed shoulder portion attached to the outer wall of the U-shaped channel and an upwardly extending circumferential wall attached to the outer section of the shoulder wherein a portion of the circumferential wall is the sealing and insulating area of the grommet.

15. A sealing member for the open end of an electrochemical cell casing comprising a circular plastic grommet wherein said grommet is made from a plastic selected from the group consisting of Nylon 12-12, plastic comprising a member alloys comprising Nylon 12-12, alloys of nylon 6-6 and ABS, and mixtures of these.

16. A sealing member for the open of an electrochemical cell casing comprising;
 a circular plastic grommet having upper and lower surfaces; a central disc portion; an axially extending boss centered on the disc portion; an annular outer section connected to the periphery of the disc portion; an upwardly extending circumferential outer wall attached at the periphery of the annular section grommet, wherein said outer wall has a diameter such that it fits closely within the open end of an electrochemical cell casing; and an annular vent membrane located in the central disc portion and encircling the boss; and
 a circular metal support member having upper and lower surfaces, wherein said support member comprises a central disc portion, strengthening means disposed in said disc portion, a downwardly and outwardly dependent skirt connected to the periphery of the central disc portion, spring means connected to the lower end of the skirt, and a radial flange connected to said spring means said flange having a diameter such that it fits closely within the circumferential wall of the grommet; wherein said spring means is adapted to be partially compressed within its elastic limit when inwardly directed radial compressive forces are applied against the outer edge of the flange and said strengthening means retards doming of the central disc portion when the spring means is under compression.

17. The sealing member of claim 16 wherein said annular outer section of the grommet comprises an annular channel having inner and outer walls wherein said inner wall is connected to the outer periphery of the central disc portion, and an outwardly directed shoulder connected to the outer wall of the channel wherein said circumferential wall is connected to the outermost portion of the shoulder.

18. The sealing member of claim 17 wherein said spring means comprises a U-shaped annular channel having an inner wall and an outer wall wherein said inner wall is connected to the downwardly dependent skirt and said flange is connected to the outer wall wherein the walls of the channel are adapted to resiliently move together under inwardly directed radial compressive forces.

19. The sealing member of claim 17 wherein the metal support member fits within the circumferential wall of the grommet such that the flange of the support member rests on the shoulder of the grommet while the central disc portion of the support member rests on the upper boss portion of the grommet.

20. The sealing member of claim 17 wherein said channel inner and outer walls and said central disc portion of the grommet have a cross sectional thickness less than about 0.03 inch.

21. The sealing member of claim 17 wherein said grommet is made from a plastic comprising a member selected from the group consisting of nylon 6-6, nylon 6-12, nylon 12-12, mixtures of nylon 6-12 and nylon 12-12, and plastic alloys containing these.

22. An insulating seal for an electrochemical cell casing comprising:
 a circular plastic grommet having an upper surface, a lower surface, an upwardly extending circumferential wall at its periphery, and an axial aperture;
 a metal support with a central disc portion, a resilient peripheral portion, an axial aperture, and means to strengthen said metal support; said strengthening means being adapted to prevent upward movement of the center of the support when said resilient peripheral portion is put under inwardly directed, radially applied, compressive forces;
 said metal support being seated within and coaxial with the circumferential wall of said grommet;
 a current collector extending through the apertures in the metal support and the grommet, with said current collector being in mechanical and electrical contact with said support; and
 a circular conductive end terminal on the side of said support opposite said grommet, with said end terminal being in contact with at least one of the current collector or the central disc portion of the support; and said end terminal being held against the support by a turned down edge of the upwardly extending circumferential wall of said grommet, whereby an integrated seal assembly is provided which assembly is adapted to be inserted into the open end of an electrochemical cell casing as a single unit.

23. The insulating seal of claim 22 wherein said grommet comprises a central disc portion having a centrally located boss wherein said axial aperture passes through the boss and further comprising coincident annular vent grooves in said upper and lower surfaces of the disc portion encircling the boss whereby a vent membrane is located between the grooves.

24. The seal of claim 22 wherein said end terminal has a diameter less than the diameter of the metal support member.

25. The seal of claim 22 wherein said end terminal has an upper surface, a lower surface, a central portion, an outer portion, and an upwardly extending wall attached to the outer portion, wherein the turned down edge of the grommet wall is turned over the upper edge of said end terminal wall.

26. The integrated sealing member of claim 22 wherein said resilient peripheral portion in the support member comprises an annular U-shaped channel having an inner wall and an outer wall wherein said walls are adapted to move towards each other under inwardly directed radial compressive forces.

27. The integrated sealing member of claim 26 wherein said metal support further comprises a downwardly and outwardly dependent skirt attached to the central disc portion wherein the inner wall of said annular channel is connected to the lower end of the skirt whereby said skirt is adapted to move inwardly and said annular channel moves downwardly under inwardly directed radial compressive forces.

28. The integrated sealing member of claim 27 wherein said skirt has a plurality of equally spaced apertures therein.

29. The integrated sealing member of claim 23 wherein said current collector comprises a rivet portion and said rivet holds the metal support and grommet together.

30. The integrated sealing member of claim 29 wherein said rivet portion comprises a shaft, a flange disposed near one end of the shaft, and a rivet head at the end of the shaft near the flange, wherein said flange engages with the lower surface of the boss and the rivet head is formed against the upper surface of the metal support whereby the support and boss are compressed axially together such that a leak tight seal is made between the flange and the boss.

31. The integrated sealing member of claim 30 wherein a layer of alkaline resistent sealant is between the flange and the boss.

32. The integrated sealing member of claim 23 wherein said current collector has a nail shape and said metal support and plastic grommet are held together by an interference fit between their apertures and the shank of said nail.

33. The integrated sealing member of claim 22 wherein said member is made of a plastic comprising a member selected from the group consisting of nylon 6-6, nylon 6-12, nylon 12-12, polysulfone, mineral filled polypropylene, and alloys of these.

34. An electrochemical cell comprising a cylindrical casing having an open end, an anode, a cathode, a separator between said anode and cathode, and a sealing member under radial compression disposed in the open end of the casing; said sealing member comprising a circular plastic grommet having a circumferential wall and a circular metal support member seated within the circumferential wall of the grommet; said support member comprising a central disc portion, an outer radially extending, continuous, annular flange, and spring means between said flange and the periphery of said disc portion; wherein a lower portion of the circumferential wall of the grommet is compressed between said flange and said casing and said spring means is under partial compression within its elastic limit whereby said spring means is adapted to expand or compress in response to temperature fluctuations so that compression of the lower portion of the grommet wall is maintained.

35. The cell of claim 34 further comprising a circular metal terminal member resting against the upper surface of the support member; said terminal member having an upwardly extending wall at its periphery; wherein the upper edge of the open end of the casing is bent inwardly over the terminal member wall with the upper portion of the grommet wall therebetween whereby the terminal member is held down against the support member by the bend in the casing.

36. The cell of claim 34 wherein the grommet has an axially extending boss, having an axial aperture therethrough, at the center of the central disc portion; the metal support has a centrally located aperture; and further comprising a current collector having a shank portion passing through the apertures of the grommet and the support, wherein the upper end of the shank is in mechanical and electrical contact with the metal support member and the lower portion of the shank is in mechanical and electrical contact with the anode.

37. The cell of claim 36 wherein said current collector comprises a rivet having a radial flange attached to the shank and a rivet head formed in the upper end of the shank, wherein the flange is seated against the lower surface of the boss, the rivet head is flared outwardly over a portion of the upper surface of the support member, and said flange and rivet head are spaced apart so that axial compression is exerted therebetween whereby a seal is created between the flange and the boss.

38. The cell of claim 36 wherein said current collector is nail shaped, the diameter of the shank is slightly greater than the diameter of the apertures in the boss and the metal support whereby an interference fit is created therebetween, and the nail head is in physical and electrical contact with the upper surface of the metal support.

39. The cell of claim 35 wherein the terminal member is recessed below the rim formed by the bend in the casing.

40. The cell of claim 35 wherein the angle between the cell casing and the inwardly bent upper edge of the casing is less than about 60°.

41. The cell of claim 34 wherein said metal support further comprises a downwardly and outwardly dependent skirt attached between the periphery of the central disc portion and the spring means wherein the angle between the skirt and the central disc portion is between about 100° and 115°.

42. The cell of claim 40 wherein said spring means is an annular "U"-shaped channel having an inner wall and an outer wall, said inner wall being connected to the skirt and said outer wall being connected to the inner circumference of said annular flange.

* * * * *